United States Patent
Park et al.

(10) Patent No.: US 9,994,731 B2
(45) Date of Patent: Jun. 12, 2018

(54) COVER WINDOW, METHOD OF MANUFACTURING COVER WINDOW, AND DISPLAY DEVICE INCLUDING COVER WINDOW

(71) Applicant: SAMSUNG DISPLAY CO., LTD., Yongin-si, Gyeonggi-do (KR)

(72) Inventors: Young Sang Park, Seoul (KR); Ji Hyuk Im, Yongin-si (KR); Chul Ho Jeong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 186 days.

(21) Appl. No.: 14/941,500

(22) Filed: Nov. 13, 2015

(65) Prior Publication Data
US 2016/0297996 A1    Oct. 13, 2016

(30) Foreign Application Priority Data
Apr. 8, 2015 (KR) .......................... 10-2015-0049661

(51) Int. Cl.
| | | |
|---|---|---|
| *B32B 9/04* | (2006.01) | |
| *C08J 3/28* | (2006.01) | |
| *C07D 303/40* | (2006.01) | |
| *H01L 23/29* | (2006.01) | |
| *C08L 83/00* | (2006.01) | |
| *C09D 183/06* | (2006.01) | |
| *G02B 1/14* | (2015.01) | |

(52) U.S. Cl.
CPC .............. *C09D 183/06* (2013.01); *G02B 1/14* (2015.01)

(58) Field of Classification Search
CPC ................................. C09D 183/06; G02B 1/14

USPC .................. 522/148, 170; 523/435; 428/447; 524/588

See application file for complete search history.

(56) References Cited

U.S. PATENT DOCUMENTS

| | | |
|---|---|---|
| 2013/0083496 A1 | 4/2013 | Franklin et al. |
| 2013/0331476 A1 | 12/2013 | Bae et al. |
| 2014/0204509 A1 | 7/2014 | Park |
| | (Continued) | |

FOREIGN PATENT DOCUMENTS

| | | |
|---|---|---|
| KR | 10-2006-0114443 A | 11/2006 |
| KR | 10-2010-0130367 A | 12/2010 |

*Primary Examiner* — William Cheung
(74) *Attorney, Agent, or Firm* — Lewis Roca Rothgerber Christie LLP (57) ABSTRACT

A cover window according to an example embodiment of the present invention includes: a base film; and a coating layer positioned on the base film, in which the coating layer is formed through application of a coating solution. The coating solution includes a compound represented by the following Chemical Formula 1.

Chemical Formula 1

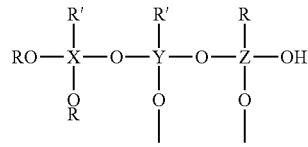

In Chemical Formula 1, R is $CH_3$, R' is an epoxy group, X, Y, and Z are each independently Si, and Y is 85% to 90% based on a total amount of X, Y and Z.

12 Claims, 2 Drawing Sheets

(56) References Cited

U.S. PATENT DOCUMENTS

2015/0093585 A1\* 4/2015 Bae ..................... C09D 183/06
428/447

\* cited by examiner

COVER WINDOW, METHOD OF MANUFACTURING COVER WINDOW, AND DISPLAY DEVICE INCLUDING COVER WINDOW

CROSS-REFERENCE TO RELATED APPLICATION

This application claims priority to and the benefit of Korean Patent Application No. 10-2015-0049661, filed in the Korean Intellectual Property Office on Apr. 8, 2015, the entire content of which is incorporated herein by reference.

BACKGROUND

1. Field

The present disclosure relates to a cover window, a method of manufacturing the cover window, and a display device including the cover window.

2. Description of the Related Art

Recently, various mobile electronic apparatuses, such as a portable phone, a navigation device, a digital camera, an electronic book, a portable game console, or various kinds of terminals, to which a liquid crystal display (LCD) or an organic electroluminescent display (organic light emitting diode, OLED) is applied as a display device, have been utilized.

In a general display device utilized in the mobile apparatuses, a cover window that is transparently constituted so that a user can see a display unit thereunder is equipped at a front side of a display panel. Since the cover window is formed at the outermost side of the device, the cover window should be strong to sustain external impacts so as to protect the display panel and the like in the apparatus.

Moreover, instead of using an existing input scheme (i.e., using an existing input structure) where a switch or a keyboard is utilized as an input device, recently, a structure where a touch panel integrated with a display screen has come into wide usage, and thus as compared to an existing mobile apparatus, in many cases, a surface of the cover window comes into contact with a finger and the like, and it's required to have stronger strength.

Further, recently, research of a flexible display device has been actively conducted, and it is desirable that a cover window applied to this display device be formed of a foldable member having flexibility.

The above information disclosed in this Background section is only for enhancement of understanding of the background of the invention and therefore it may contain information that does not form the prior art that is already known in this country to a person of ordinary skill in the art.

SUMMARY

Aspects according to one or more embodiments of the present invention is directed toward a cover window for a display device capable of being folded and having surface hardness and hardness restoring force at a set or predetermined level or more, a method of manufacturing the same, and a display device including the same.

According to an example embodiment of the present invention, a cover window includes: a base film, and a coating layer on the base film, in which the coating layer is formed through application of a coating solution, the coating solution including a first monomer, the first monomer being a reaction product of a compound represented by Chemical Formula 1.

Chemical Formula 1

In Chemical Formula 1, R is $CH_3$, R' is an epoxy group, X, Y, and Z are each independently Si, and Y is 85% to 90% based on a total amount of X, Y and Z.

The first monomer may be a compound represented by Chemical Formula 2, and obtained by reacting the compound represented by Chemical Formula 1 under a catalyst.

Chemical Formula 2

In Chemical Formula 2, R is $CH_3$, R' is an epoxy group, and X, Y, and Z are each independently Si.

In the compound represented by Chemical Formula 1, Z may be 10% to 15% based on a total amount of X, Y and Z.

The coating solution may further include a second monomer, an initiator, and a solvent.

The second monomer may include a compound represented by Chemical Formula 3.

Chemical Formula 3

The initiator may include an iodine-based initiator.

The iodine-based initiator may include a compound represented by Chemical Formula 4.

Chemical Formula 4

A content of the initiator may be 0.5 wt % to 8.0 wt % based on a total weight of the coating solution, and a content of the first monomer may be 40 wt % to 90 wt % based on the total weight of the coating solution.

According to another example embodiment of the present invention, a method of manufacturing a cover window includes: preparing and converting under a catalyst a compound represented by Chemical Formula 1 into a first monomer represented by Chemical Formula 2, mixing a second monomer with the first monomer to form a mixture, adding a solvent to the mixture to form a coating solution, applying the coating solution on a base film, and performing drying and curing to form a cured coating solution.

Chemical Formula 1

Chemical Formula 2

In Chemical Formulae 1 and 2, R is CH$_3$, R' is an epoxy group, and X, Y, and Z are each independently Si.

The method may further include annealing the cured coating solution.

The annealing may be performed under a normal humidity condition.

According to yet another example embodiment of the present invention, a display device includes: a display panel; and a cover window on the display panel, in which the cover window includes a base film, and a coating layer on the base film, the coating layer is formed through the application of a coating solution including a first monomer, the first monomer being a reaction product of a compound represented by Chemical Formula 1.

Chemical Formula 1

In Chemical Formula 1, R is CH$_3$, R' is an epoxy group, X, Y, and Z are each independently Si, and Y is 85% to 90% based on a total amount of X, Y and Z.

The first monomer may be a compound represented by Chemical Formula 2 and obtained by reacting the compound represented by Chemical Formula 1 under a catalyst.

Chemical Formula 2

In Chemical Formula 2, R is CH$_3$, R' is an epoxy group, and X, Y, and Z are each independently Si.

In the compound represented by Chemical Formula 1, Z may be 10% to 15% based on a total amount of X, Y and Z.

The coating solution may further include a second monomer, an initiator, and a solvent.

The second monomer may include a compound represented by Chemical Formula 3.

Chemical Formula 3

The initiator may include an iodine-based initiator, and the iodine-based initiator may include a compound represented by Chemical Formula 4.

Chemical Formula 4

A content of the initiator may be about 0.5 wt % to about 8.0 wt % based on a total weight of the coating solution, and a content of the first monomer may be about 40 wt % to about 90 wt % based on the total weight of the coating solution.

A cover window and a display device including the same according to example embodiments of the present invention can be folded and have a satisfactory surface hardness and a hardness restoring force (e.g., have a surface hardness and a hardness restoring force at a set or predetermined level or more).

DETAILED DESCRIPTION

The present invention will be described more fully hereinafter with reference to the accompanying drawings, in which example embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening element(s) may also be present. In contrast, when an element is referred to as being "directly on" another element, there are no intervening elements present.

Figure 1:
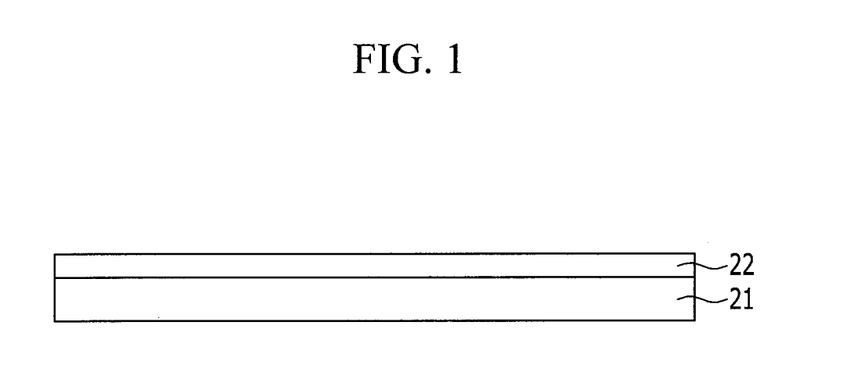
FIG. 1 is a cross-sectional view of a cover window according to an example embodiment of the present invention.

Hereinafter, a cover window according to an example embodiment of the present invention will be described with reference to FIG. 1. FIG. 1 is a cross-sectional view of the cover window according to the example embodiment of the present invention.

First, as illustrated in FIG. 1, a cover window 20 includes a base film 21 and a coating layer 22 positioned on the base film 21.

The base film 21 is formed of a plastic film such as polyethylene terephthalate (PET), polycarbonate (PC), polyimide (PI), or poly(methylmethacrylate) (PMMA).

The coating layer 22 is positioned on the base film 21, and is formed of a material such as an organic hybrid resin, an inorganic hybrid resin, or an acryl resin.

In the example embodiment of the present invention, only the coating layer 22 positioned directly on the base film 21 is described, but the example embodiment is not limited thereto, and any type (kind) of cover window is feasible. For example, in addition to the coating layer and the base film included in the constitution (i.e., the structure) described in the present specification, a constitution including an adhesive layer attaching the coating layer and the base film is feasible.

The coating layer 22 according to the example embodiment of the present invention is formed by applying a set or predetermined coating solution on the base film 21 and curing the coating solution.

The coating solution according to the example embodiment of the present invention may include a first monomer, a second monomer, an initiator, and a solvent.

First, the first monomer according to the example embodiment of the present invention is a hybrimer, and is an organic-inorganic hybrid material. The hybrimer that is the first monomer is obtained by reacting a compound represented by the following Chemical Formula 1 under a catalyst, and the first monomer includes a compound represented by the following Chemical Formula 2.

Chemical Formula 1

Chemical Formula 2

In Chemical Formula 2, R is $CH_3$, R' is an epoxy group, and X, Y, and Z are Si. R' that is the epoxy group may be ring-opened in a curing process, and may be cross-linked with a second monomer as will be described later through the ring-opened epoxy group.

In Chemical Formula 1, a portion represented by Y may occupy 80% or more of the corresponding Structural Formula (e.g., based on a total amount of X, Y and Z), and for example, a ratio (e.g., a ratio of Y to a total amount of X, Y and Z) of about 85% to 90%. With respect to this, in Chemical Formula 1, a portion represented by Z may occupy 10% to 15% of the corresponding Structural Formula. In this case, in Chemical Formula 1, a portion represented by X may be in a very small amount.

In the compound for forming the first monomer and represented by Chemical Formula 1, a ratio of Y to Z is significantly high (i.e., the amount of Y is significantly higher than the amount of Z), and through Y occupying a high ratio, a hard coating solution having high hardness may be provided. This is because through Y, cross-linking such as bonding with the second monomer is formed.

Based on the total content (i.e., the total weight) of the coating solution, a content of the first monomer may be about 40 wt % to about 90 wt %, and may be, for example, about 60 wt %.

The second monomer according to the example embodiment of the present invention may include a compound represented by the following Chemical Formula 3.

Chemical Formula 3

The second monomer is bonded with the first monomer under a set or predetermined condition to form cross-linking for providing a set or predetermined hardness.

The coating solution according to the example embodiment of the present invention may include an initiator, and for example, may include an iodine-based initiator. The iodine-based initiator may include a compound represented by the following Chemical Formula 4, but is not limited thereto.

Chemical Formula 4

The iodine-based initiator may be photo-curable, and the initiators are activated by light in a process of forming the coating layer. The monomers may be polymerized by the activated initiator.

A content of the initiator may be about 0.5 wt % to about 8.0 wt %, and for example, is about 2 wt %, based on a total weight of the coating solution. This is because in the case where the initiator has the aforementioned content, a reaction speed to light or heat may be appropriately adjusted.

The solvent included according to the example embodiment of the present invention may be methyl ethyl ketone (MEK), but is not limited thereto, and any suitable solvent for forming the coating solution is feasible.

The coating layer 22 formed by the aforementioned coating solution may have a suitable hardness and hardness restoring force required for an external surface of the display device, and may reduce a yellowing phenomenon occurring in the case where the coating layer is exposed to UV and the like over a long period of time. That is, according to the example embodiment of the present invention, the cover window having improved reliability and durability can be provided.

Figure 2:
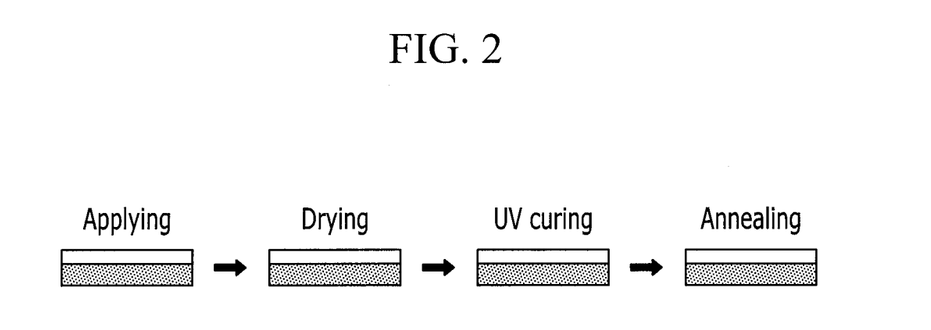
FIG. 2 illustrates a process of manufacturing a cover window according to the example embodiment of the present invention.

Next, a process of manufacturing the cover window according to an example embodiment of the present invention will be described with reference to FIG. 2. FIG. 2 is a process cross-sectional view illustrating a method of manufacturing the cover window for the display device by the example embodiment of the present invention.

First, the base film 21 is formed by utilizing polyethylene terephthalate (PET), triacetyl cellulose (TAC), polyimide (PI), polycarbonate (PC), thermoplastic polyurethane (TPU), a silicon rubber, and/or the like.

Subsequently, the coating solution for forming the coating layer 22 is applied on the base film 21, dried by heat and/or the like, and cured through UV irradiation.

Next, the cured coating solution is subjected to an annealing process to form the coating layer 22. In this case, if the annealing process does not require a separate high humidity condition, the annealing process may be performed under a normal humidity condition (e.g., under the ambient humidity). Therefore, the cover window can be manufactured through the same single-acting equipment as the aforementioned process such as coating and drying of the coating solution. According to the aforementioned manufacturing process, the manufacturing time and the cost can be reduced.

In this case, the coating solution may be prepared by the following method.

First, the compound represented by Chemical Formula 1 is reacted by a method (such as sol-gel) under a catalyst. The compound represented by Chemical Formula 1 is converted into the compound represented by Chemical Formula 2 by the aforementioned reaction, and the compound represented by Chemical Formula 2 is referred to as (e.g., called) the first monomer.

Next, after the second monomer (for example, diepoxide) that is the compound represented by Chemical Formula 3 and the prepared first monomer are mixed, the solvent (for example, MEK) is added.

In the coating solution where the monomers are mixed according to the aforementioned order, the number of bonds is increased as compared to the coating solution where the solvent is first added to the first monomer and the first monomer is then mixed with the second monomer, and thus the hardness of the coating layer is improved.

Figure 3:
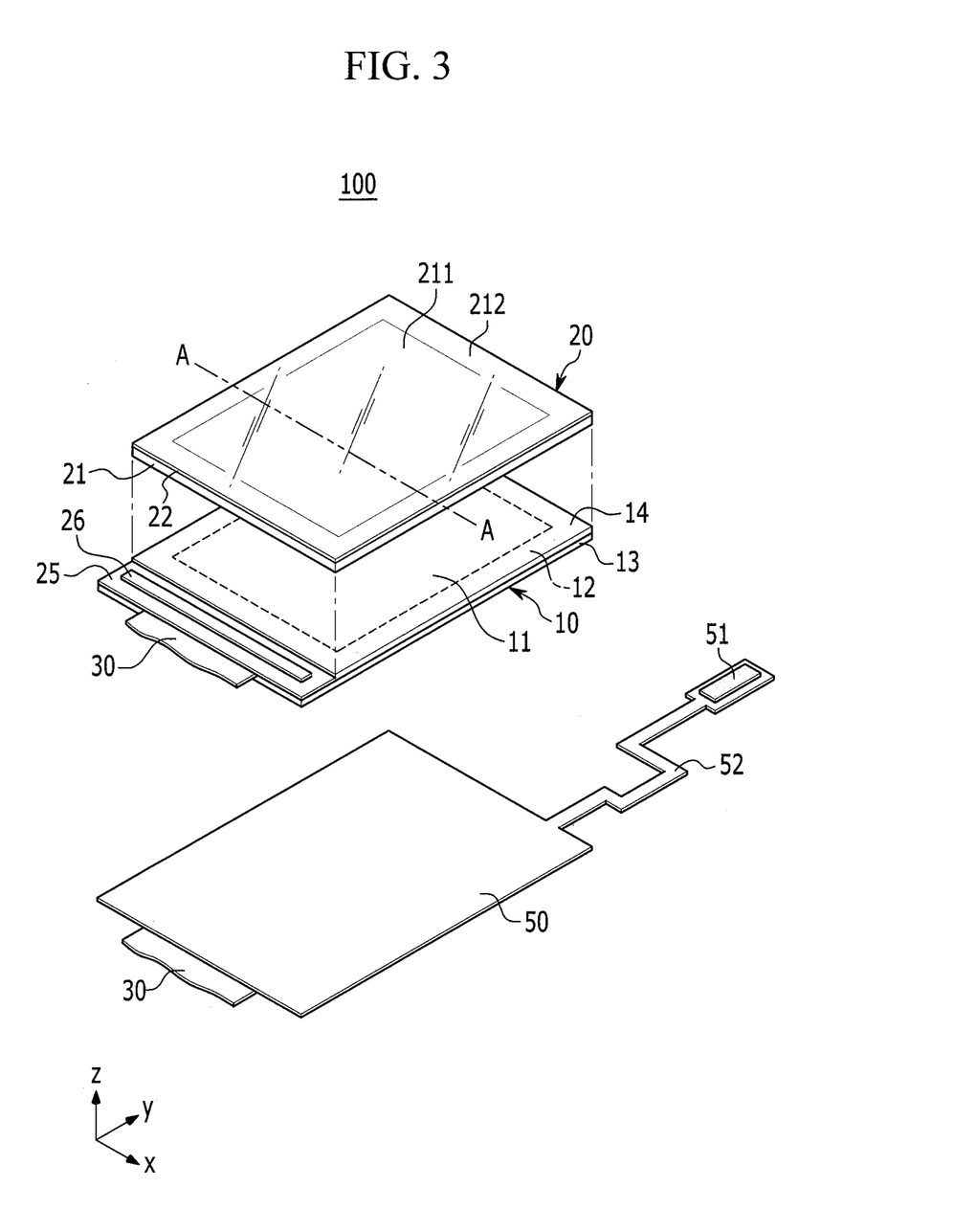
FIG. 3 is an exploded perspective view of a display device according to an example embodiment of the present invention.

Hereinafter, a display device according to an example embodiment of the present invention will be reviewed with reference to FIG. 3. FIG. 3 is an exploded perspective view of the display device according to the example embodiment of the present invention.

Referring to FIG. 3, a display device 100 according to the example embodiment of the present invention includes a display panel 10 for displaying an image, and a cover window 20 disposed at the front of the display panel 10 to protect the display panel 10.

The display panel 10 may be an organic light emitting display panel. On the other hand, the display panel 10 may be a display panel other than the organic light emitting display panel, for example, a liquid crystal display panel, where the display panel 10 does not include a separate upper substrate, and both a field generating electrode and a liquid crystal layer are included in a lower substrate. That is, in the present example embodiment, for convenience of the description, the organic light emitting display panel is described as an example, but embodiments of the present invention is not limited thereto.

The display panel 10 is electrically connected to a printed circuit board 50 through a flexible printed circuit 30.

Pixels that are basic units of displaying an image are arranged in a matrix form on a first substrate 13 of the display panel 10, and a second substrate 14 is adhered to the first substrate 13 through a sealing member to protect the pixels. The first substrate 13 may become a rear surface substrate, and the second substrate 14 may become a front surface substrate.

For example, in an active matrix organic light emitting display panel, a pixel includes an organic light emitting element constituted by an anode electrode, an organic light emitting layer, and a cathode electrode, and a driving circuit unit driving the organic light emitting element. The driving circuit unit may be a thin film transistor. A data line is connected to a source terminal of the thin film transistor, and a gate line is connected to a gate terminal. In addition, one electrode of the anode electrode and the cathode electrode of the organic light emitting element is connected to a drain terminal.

The data line and the gate line are connected through the flexible printed circuit 30 to the printed circuit board 50. If an electric signal is input through the printed circuit board 50 to the source terminal and the gate terminal of the thin film transistor, the thin film transistor is turned on or turned off according to the input signal, and when turned on, the thin film transistor is to output an electric signal required to drive the pixel to the drain terminal.

An integrated circuit chip 26 is mounted on the first substrate 13 to control the display panel 10. The integrated circuit chip 26 generates timing signals for applying a data driving signal and a gate driving signal at an appropriate time. In addition, these signals are each applied to the data line and the gate line of the display panel 10. A passivation layer 25 is formed around the integrated circuit chip 26 to protect the integrated circuit chip 26.

Electronic elements for processing the driving signals are mounted on the printed circuit board 50. The printed circuit board 50 includes a connector 51 and an extension portion 52, and the extension portion 52 is installed at an end of the connector 51 to transfer an external signal to the printed circuit board 50.

A cover window 20 protecting the display panel 10 is positioned at the front of the display panel 10 (i.e., the side of the display panel 10 facing the user). The cover window 20 serves to protect the display panel 10 so that the display panel 10 is not broken by an external impact. In addition, the cover window 20 may be attached to the display panel 10 by a set or predetermined adhesive layer. In another embodiment, the display panel 10 and the cover window 20 may be formed to be spaced apart from each other while an air layer is interposed therebetween.

The cover window 20 includes a base film 21 and a coating layer 22 formed on the base film 21.

The base film 21 includes a transparent portion 211 transparently formed in a region corresponding to a display unit 11 of the display panel 10 so that the display unit 11 is seen from the outside, and an opaque portion 212 opaquely formed in a region corresponding to a non-display unit 12 of the display panel 10 so as to reduce or prevent the non-display unit 12 from being seen from the outside. The opaque portion 212 serves to cover wires, parts, and the like formed in the non-display unit 12 of the display panel 10 so that the wires, the parts, and the like are not seen from the outside. In the opaque portion 212, logos of products, ornament patterns, and the like may be included. The present specification describes the base film 21 as divided into the transparent portion 211 and the opaque portion 212, but it is not limited thereto, and in another embodiment, the base film 21 includes only the transparent portion 211.

The base film 21 may be formed of polyethylene terephthalate (PET), triacetyl cellulose (TAC), polyimide (PI), polycarbonate (PC), thermoplastic polyurethane (TPU), a silicon rubber, and/or the like.

The coating layer 22 may be formed by applying a set or predetermined coating solution on the base film 21 and curing the coating solution. The coating layer 22 according to the example embodiment of the present invention has a hardness and a hardness restoring force at a respective set or predetermined level or more.

Since the coating layer 22 is the same as the aforementioned example embodiment, hereinafter, a description thereof will not be repeated.

The display device 100 according to the present example embodiment may be formed of a bendable material. For example, the display device 100 may be bent according to the line A-A, and thus the cover window 20 may be bent along the line A-A. Further, according to another example embodiment of the invention, the display device may be bent in a direction that is crossing (e.g., orthogonal) to the line A-A.

Hereinafter, the hardness and hardness restoring force of the cover window according to the example embodiment of the present invention will be described with reference to Tables 1 and 2.

TABLE 1

|  | Hardness of coating layer | Hardness directly after pressing | Hard ness after 24 hours pass |
|---|---|---|---|
| Example 1 | 8H | 3B | H |
| Comparative Example 1 | 8H | 6B | 2B |

First, Example 1 is a coating layer formed from a coating solution where the compound represented by Chemical Formula 1 has 12% Z and 88% Y based on the total amount of X, Y, and Z (i.e., a ratio of Z is 12% and a ratio of Y is 88%). Comparative Example 1 is the coating layer formed from a coating solution where the compound represented by Chemical Formula 1 has 16% Z and 82% Y.

With respect to this, as a result of reviewing the hardness of Example 1, in the case where there was no external force such as pressing, the coating layer had a hardness of about 8H, and after an external force (such as pressing) is applied, the coating layer had a hardness of about 3B. After 24 hours, the hardness of the coating layer was H. According to Example 1, it could be seen that the hardness of the coating layer could be reduced by external stimulations (such as pressing), but as time passed, the hardness was restored.

Next, reviewing Comparative Example 1, in the case where there was no external force (such as pressing), the hardness was about 8H, which is a hardness that is substantially the same as that of Example 1.

However, as a result of reviewing the hardness directly after pressing, the hardness was about 6B, and hardness measured after 24 hours passed was about 2B, which represented a hardness that was lower than that of Example 1. That is, according to Comparative Example 1, it could be seen that the hardness of the coating layer was reduced by external stimulations (such as pressing) and even though time (e.g., a significant amount of time) passed, the reduced hardness was not restored.

To sum up, it was confirmed that like Example 1, in the compound represented by Chemical Formula 1, as the ratio of Y was increased, the hardness and hardness restoring force of the coating layer including the same were improved.

Next, the hardness and hardness restoring force of the cover window according to a manufacturing method of the present invention will be reviewed with reference to Table 2.

TABLE 2

|  | Hardness of coating layer | Hardness directly after pressing | Hardness after 24 hours pass |
|---|---|---|---|
| Example 2 | 8H | 3B | H |
| Comparative Example 2 | 9H | 5B | 3B |

First, Example 2 is formed from a coating solution where the first monomer, the second monomer, and the solvent are sequentially mixed in the stated order.

In this case, in the state where there was no external stimulation (such as pressing), the hardness of the coating layer was about 8H, and the hardness after an external stimulation was about 3B. Further, as a result of reviewing the hardness of the coating layer 24 hours after the stimulation was occurred, it was confirmed that the hardness was about H.

That is, according to Example 2, it can be confirmed that the hardness of the cover window may be temporarily reduced by external stimulations (such as pressing), but as time passes, the hardness is restored.

Comparative Example 2 is formed from a coating solution where the first monomer, the solvent, and the second monomer are sequentially mixed in the stated order. In the state where there was no external stimulation (such as pressing), the hardness of the coating layer was about 9H which was almost the same as that of Example 2. Thereafter, in the case where external stimulation was applied, the hardness was about 5B, and even 24 hours after the stimulation was applied, the hardness of the coating layer was maintained at about 3B.

That is, in the cover window according to Comparative Example 2, it was confirmed that the hardness is reduced in the case where external simulation was applied, and the degree of restoration of the hardness as time passed is low.

Accordingly, it can be seen that after the act of preparing the first monomer, a difference in the degree of bonding of the first monomer and the second monomer occurs according to the order (i.e., the sequence) of addition of the second monomer and the solvent (i.e., a difference in the degree of bonding of the first monomer and the second monomer occurs depending on if the second monomer is added first into the first monomer or if the solvent is added first into the first monomer), thus affecting the hardness among the physical properties of the coating solution.

To sum up, the coating layer according to an example embodiment of the present invention has a suitable hardness required for the external surface of the display device, and has a characteristic where the hardness reduced by external stimulations is restored as time passed. Further, a yellowing phenomenon occurring in the case of exposure to UV and the like over a long period of time may be significantly reduced, and thus the cover window having improved reliability and durability can be provided.

Expressions such as "at least one of," when preceding a list of elements, modify the entire list of elements and do not modify the individual elements of the list. Further, the use of "may" when describing embodiments of the present invention refers to "one or more embodiments of the present invention." As used herein, the term "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

| Description of symbols | |
|---|---|
| 10: Display panel | 20: Cover window |
| 21: Base film | 22: Coating layer |
| 30: Flexible printed circuit | 50: Printed circuit board |

What is claimed is:

1. A cover window comprising:

a base film, and a coating layer on the base film, wherein the coating layer is formed through application of a coating solution, the coating solution comprising a first monomer, the first monomer being a compound represented by Chemical Formula 2:

Chemical Formula 2 wherein in Chemical Formula 2,

R is $CH_3$,

R' is an epoxy group, and

X, Y, and Z are each independently Si

2. The cover window of claim 1, wherein:

the coating solution further comprises:

a second monomer, an initiator, and a solvent.

3. The cover window of claim 2, wherein:

the second monomer comprises a compound represented by Chemical Formula 3:

Chemical Formula 3

4. The cover window of claim 3, wherein:

the initiator comprises an iodine-based initiator.

5. The cover window of claim 4, wherein:

the iodine-based initiator comprises a compound represented by Chemical Formula 4:

Chemical Formula 4

6. The cover window of claim 4, wherein:
a content of the initiator is 0.5 wt % to 8.0 wt % based on a total weight of the coating solution, and
a content of the first monomer is 40 wt % to 90 wt % based on the total weight of the coating solution.

7. A display device comprising:
a display panel; and
a cover window on the display panel,
wherein the cover window comprises:
a base film, and
a coating layer on the base film,
wherein the coating layer is formed through application of a coating solution comprising a first monomer, the first monomer being a compound represented by Chemical Formula 2:

Chemical Formula 2 wherein in Chemical Formula 2,
R is $CH_3$,
R' is an epoxy group, and
X, Y, and Z are each independently Si

8. The display device of claim 7, wherein:
the coating solution further comprises:
a second monomer,
an initiator, and
a solvent.

9. The display device of claim 8, wherein:
the second monomer comprises a compound represented by Chemical Formula 3:

Chemical Formula 3

10. The display device of claim 9, wherein:
the initiator comprises an iodine-based initiator, and
the iodine-based initiator comprises a compound represented by Chemical Formula 4:

Chemical Formula 4

11. The display device of claim 10, wherein:
a content of the initiator is about 0.5 wt % to about 8.0 wt % based on a total weight of the coating solution, and
a content of the first monomer is about 40 wt % to about 90 wt % based on the total weight of the coating solution.

12. A display device comprising:
a display panel; and
a cover window on the display panel,
wherein the cover window comprises:
a base film, and
a coating layer on the base film,
wherein the coating layer is formed through application of a coating solution comprising a first monomer, the first monomer being a reaction product of a compound represented by Chemical Formula 1, Chemical Formula 5

Chemical Formula 6

Chemical Formula 7 wherein in Chemical Formula 1,
A and A' are each independently selected from a moiety represented by following Chemical Formulae 5-7:

Chemical Formula 5

Chemical Formula 6

Chemical Formula 7 wherein in Formulae 1 and 5-7,
R is $CH_3$,
R' is an epoxy group,
X, Y, and Z are each independently Si,
* represents a bonding site, and
in Formula 1, a number of Y is 85% to 90% based on a total number of X, Y and Z.

* * * * *